United States Patent [19]

Selph

[11] Patent Number: 5,044,321
[45] Date of Patent: Sep. 3, 1991

[54] PET CARRIER AND RESTRAINT FOR VEHICLE USE

[76] Inventor: Lottie J. Selph, P.O. Box 197, Greer, S.C. 29652

[21] Appl. No.: 381,982

[22] Filed: Jul. 19, 1989

[51] Int. Cl.$^5$ ............................................. A01K 29/00
[52] U.S. Cl. ...................................................... 119/96
[58] Field of Search .................... 119/1, 15, 19, 96; 5/94, 118, 273; 297/464, 465, 485; 224/101, 158, 159, 42.43

[56] References Cited

U.S. PATENT DOCUMENTS

| | | | |
|---|---|---|---|
| 1,261,951 | 4/1918 | MacGowan | 5/94 |
| 2,546,790 | 3/1951 | Shook | 5/94 X |
| 2,557,556 | 6/1951 | Morris | 5/94 X |
| 4,010,880 | 3/1977 | Guillot-Munoz | 119/96 X |
| 4,235,474 | 11/1980 | Rosenberg | 297/485 X |
| 4,598,945 | 7/1986 | Hopkins | 5/94 X |
| 4,702,523 | 10/1987 | Schrader et al. | 297/465 X |

FOREIGN PATENT DOCUMENTS 1584497 2/1981 United Kingdom ............... 297/465

Primary Examiner—Gene Mancene
Assistant Examiner—R. Thomas Price
Attorney, Agent, or Firm—Cort Flint

[57] ABSTRACT

A protective pet carrier (A) is illustrated for protecting and transporting a pet (20) during vehicular transportation. Protective pet carrier (A) includes a web (12) and a restraining pouch (B) which encompasses a substantial portion of a body of the pet so that the pet is effectively rendered immobile in the pouch and no firm foundation exists as would be required for the pet to spring from the pouch for escape. The carrier is attached to an associated structure via a hood (C) which may fit over a head rest (44) of an automobile seat. Alternately, plural straps (32, 34) may be utilized for attaching pet carrier either to a person's body or automobile seats. In another embodiment, a frame (D) is provided for securing the pet carrier.

19 Claims, 4 Drawing Sheets

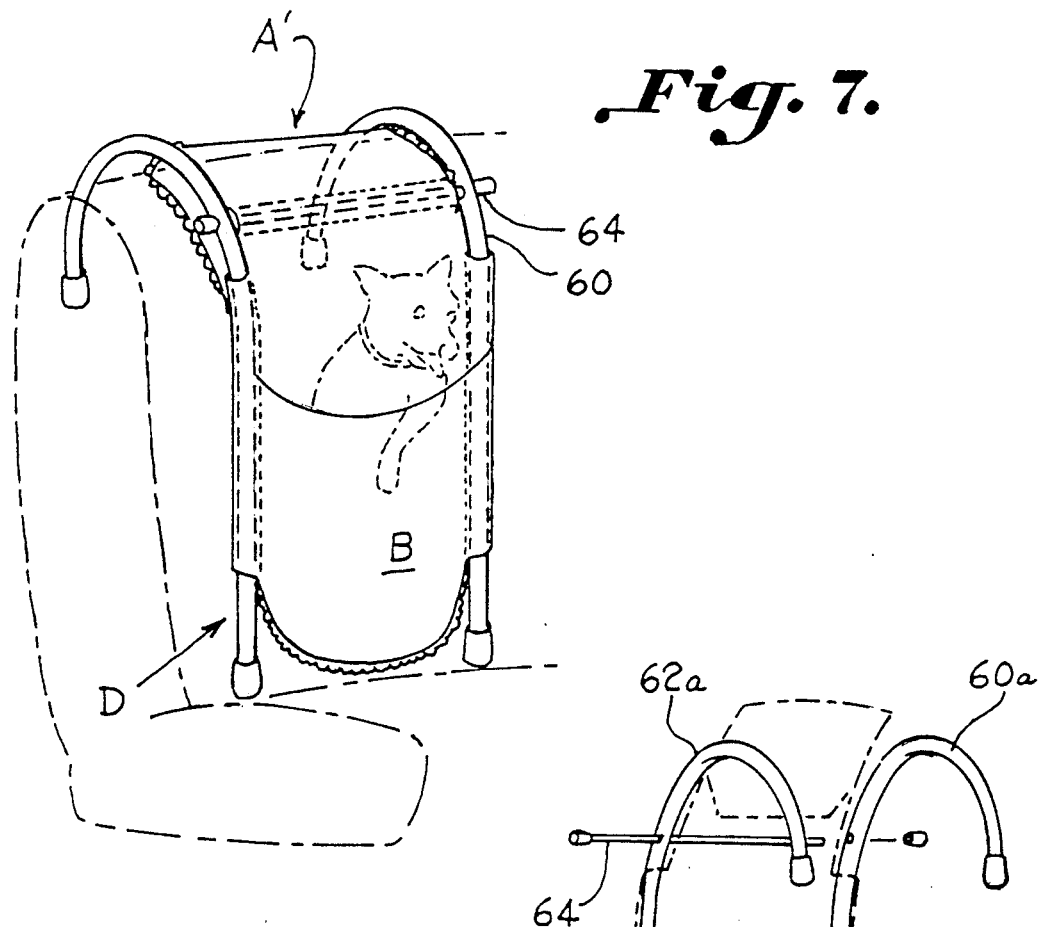
Fig. 7.
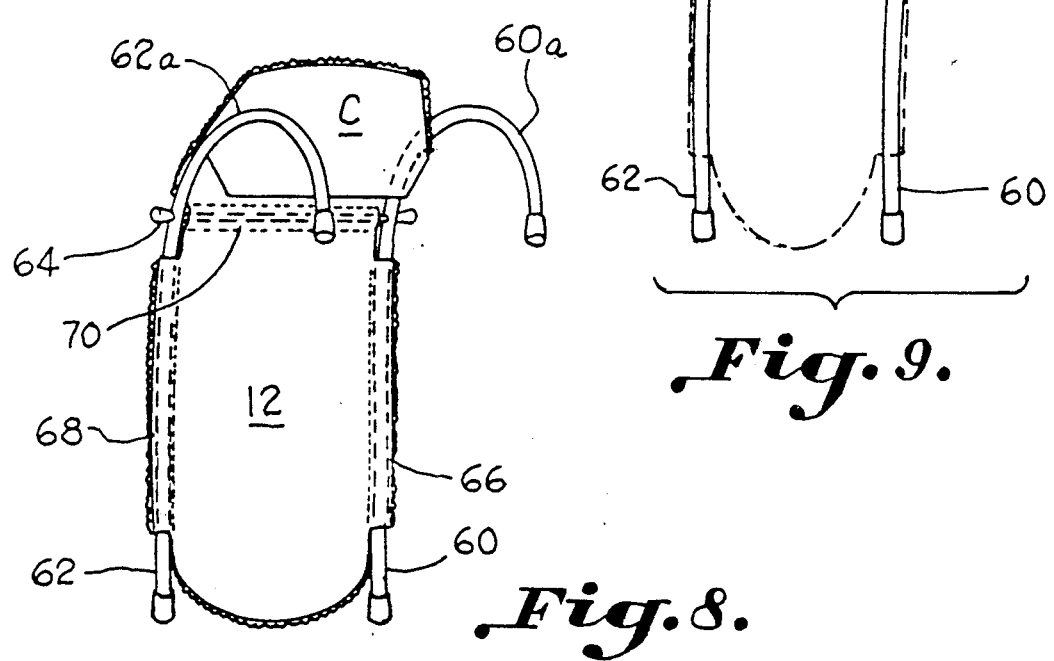
Fig. 8.
Fig. 9.

PET CARRIER AND RESTRAINT FOR VEHICLE USE

BACKGROUND OF THE INVENTION

The invention relates to a device for restraining and protecting a pet animal while in vehicular transit for the safety of the animal and the other occupants of the vehicle.

Infant and child restraint seats for automotive use are well known. Typically, these devices include straps, bracket, and other means for securing the seat to the automobile seat, as shown in U.S. Pat. Nos. 4,345,791 and 1,584,161. The infant seat includes additional straps fastened to the infant or child into the infant seat. These devices are not suitable for fastening the body of a pet animal. The use of straps is generally not effective for fastening the body of an animal to a vehicle seat in a simple and uncluttered manner, although this has been previously proposed in U.S. Pat. Nos. 4,512,286, 4,324,204, and 4,010,880. As can be seen by these examples, strapping involves complicated assembles for securing and restraining a pet. In a vehicular environment, this results in unsightly arrangements and the pet is still allowed sufficient movement to interfere with the driver or other occupants of the vehicle. The pet may still be hurled a distance in the vehicle to injure the pet or occupants. Strapping typically does not restrain the legs of the pet so that it is still free to roam in the vehicle and distract the driver. U.S. Pat. No. 3,150,640 discloses a protective restraint bag for animals, but no means is provided for securing the bag within an automobile.

In vehicular travel, a pet needs to have a suitable restraint to prevent the driver from having an accident due to being distracted by the pet. A large number of pets are treated by veterinarians which have been injured from being hurled through an automobile like a missile due to sudden emergency stops, or in some cases, pets that have leaped out of a window of a traveling automobile. The provision of an effective pet restraint for vehicular use is a problem to which considerable attention need be given.

Accordingly, an object of the invention is to provide a pet restraint for vehicular and automotive use which will effectively restrain a pet and provide safety to the pet and the occupants.

Another object of the invention is to provide a vehicular pet restraint which will effectively restrain the pet so that no movement of the pet in the vehicle is permitted which would distract the driver or other occupants.

Another object of the invention is to provide a pet restraint which can effectively restrain a pet for safe transportation in an automobile, bicycle, motorcycle, or walking.

SUMMARY OF THE INVENTION

The above objectives are accomplished according to the present invention by providing a restraint pouch carried by a web which may be attached to an associated structure of a vehicle for transporting the pet. Preferably, the pouch is secured to a web which may be attached to a seat back of an automobile or to the back of a person for transportation wherein the pet is received in the pouch without a firm standing as will allow the pet to escape from the pouch. A pouch opening is spaced above a pouch closure a sufficient distance so that the pouch fits underneath the forward shoulder of the pet so that the pet is rendered virtually immobile so that he may not escape to distract the driver. In one embodiment, a hood is provided so that the web may be affixed to a head rest of an automobile seat back. Alternately, a frame may be provided so that the restraining pouch may be worn by a person or may be hooked to the back seat. In another embodiment, straps are provided for attaching the web to an associated structure and in the case of an automobile, the straps allow the pouch to be secured near the driver for control over the pet.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 7 is a perspective view illustrating a protective pet carrier in a modified form of the invention as attached to the seat back;

FIG. 8 is a rear perspective view of a pet carrier having a frame assembly constructed in accordance with the invention; and FIG. 9 is a perspective view of a break-down frame assembly for a protective pet carrier constructed in accordance with the invention.

DESCRIPTION OF A PREFERRED EMBODIMENT

Figure 1:
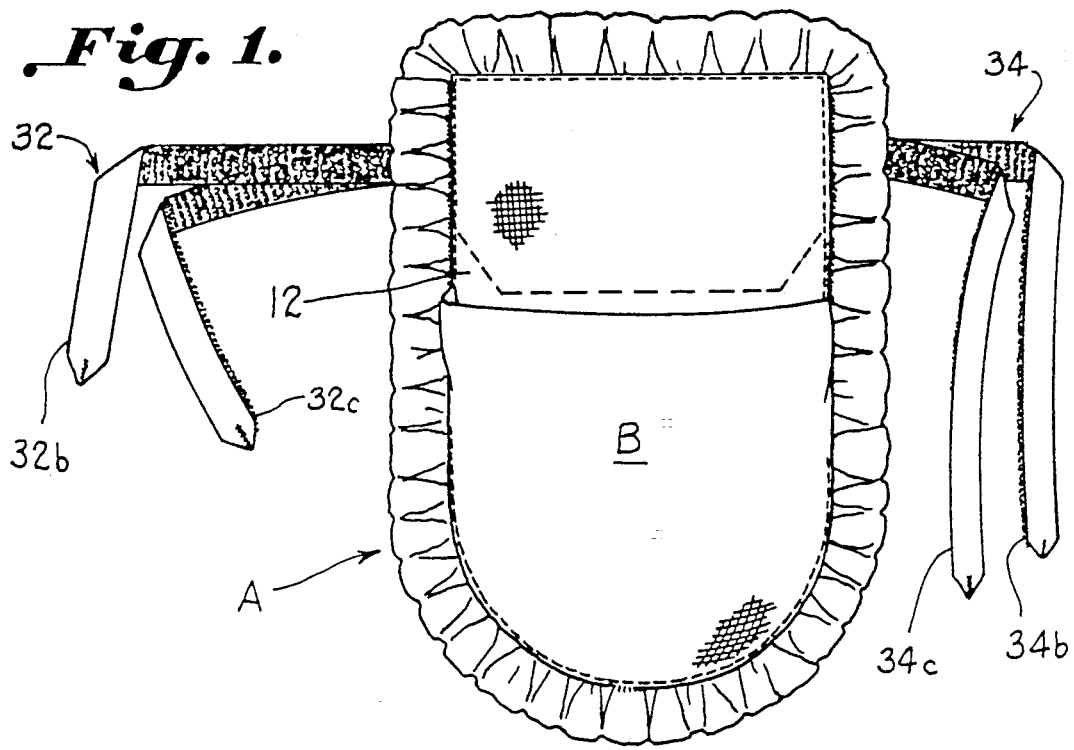
FIG. 1 is a front elevation illustrating a protective pet carrier constructed in accordance with the present invention.
Figure 2:
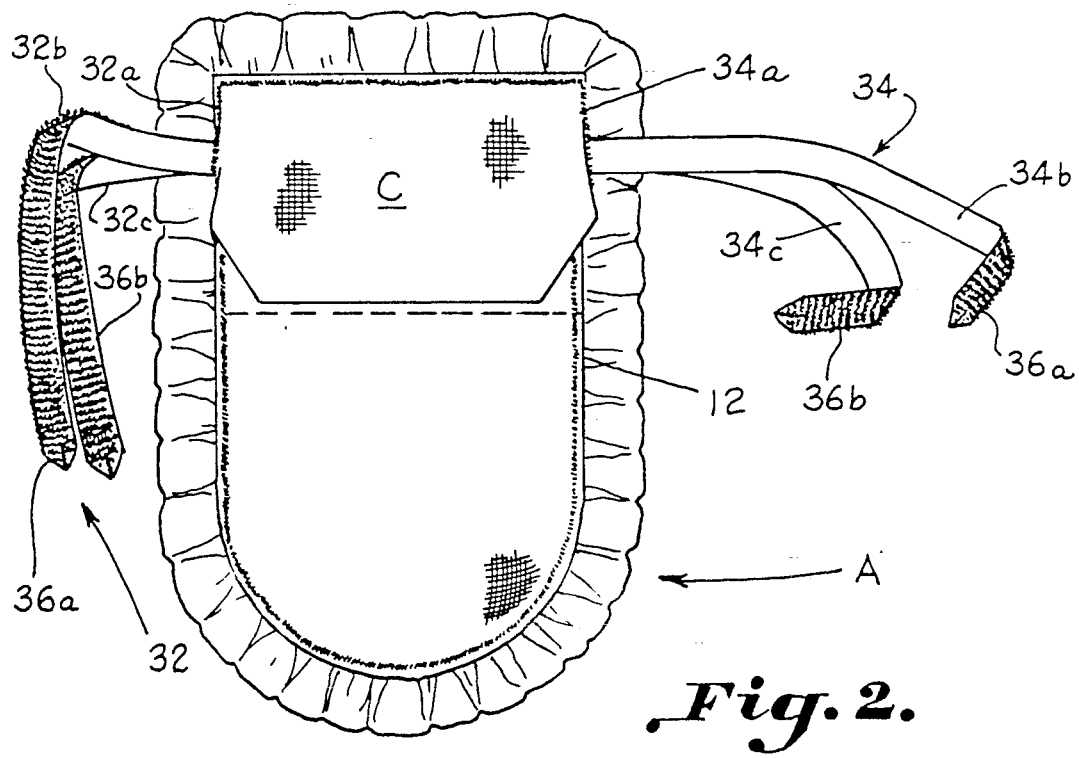
FIG. 2 is a rear plan view of a protective pet carrier constructed in accordance with the present invention.
Figure 3:
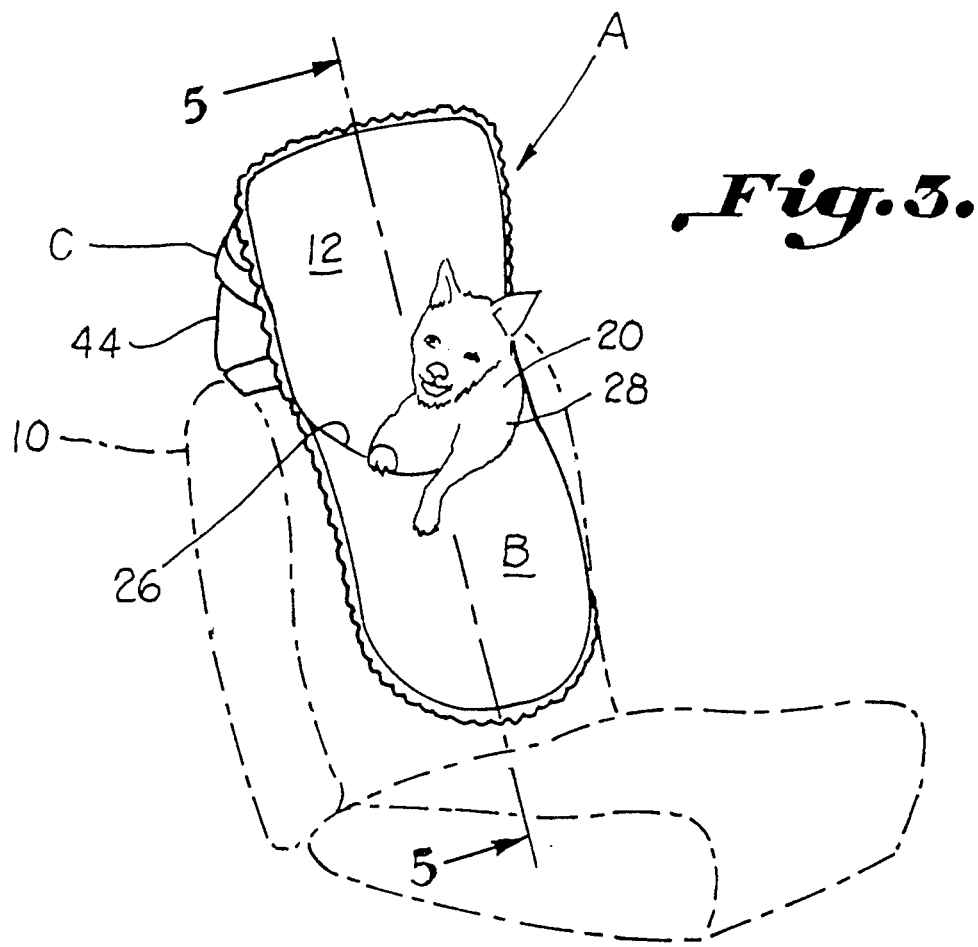
FIG. 3 is a perspective view illustrating a protective pet carrier attached to an automobile seat constructed in accordance with the present invention.
Figure 5:
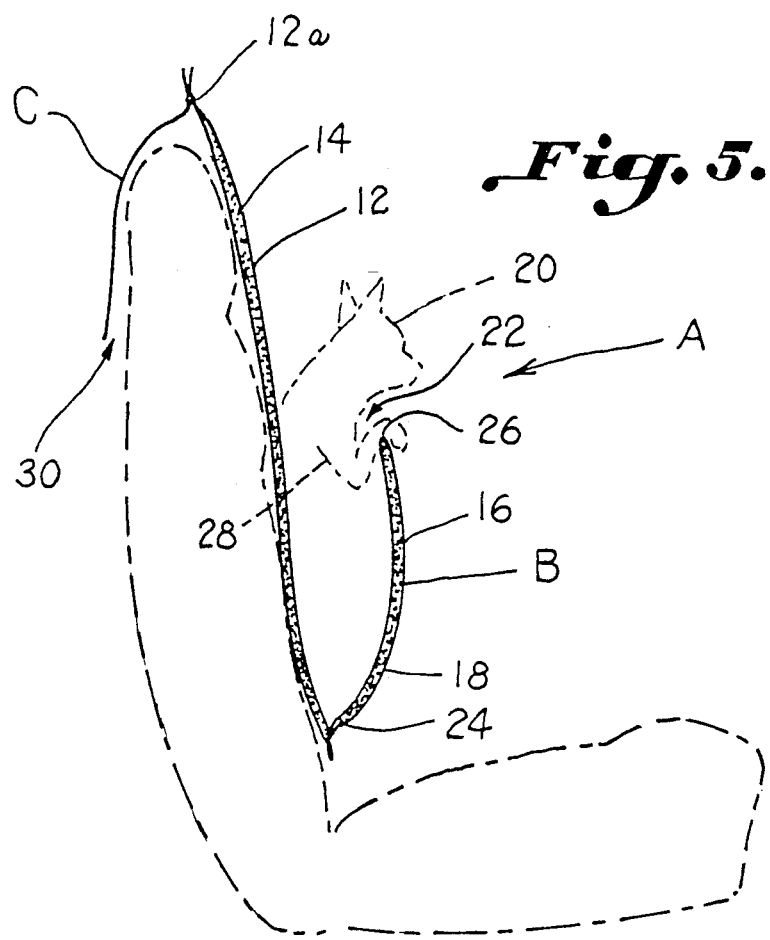
FIG. 5 is a sectional view of a protective pet carrier constructed according to the invention as attached to an automobile seat illustrating a pet restraining pouch constructed according to the invention.

Referring now in more detail to the drawings, a protective pet carrier for restraining a pet in vehicle transit is designated generally as A. As can best be seen in FIG. 3, pet carrier A is attached to a seat 10 of a vehicle. The term "vehicle" means any means by which the pet may be transported, for example, by automobile or by pedestrian, or by bicycle or motorcycle transportation when attached to a person's body. "Associated structure" as used in the application means an associated structure of an automobile, or a person's body, or other structure to which the pet carrier may be attached while the pet is transported. Referring now in more detail to the construction of the invention, as can best be seen in FIG. 1, pet carrier A includes a web 12 of flexible material which may be any suitable fabric. Preferably, as can best be seen in FIG. 5, web 12 is a padded material which includes padding 14 between two layers of material 12. A restraining pouch B is carried by web 12 and also includes a piece of flexible material 16 with padding 18 for the protection of a pet 20.

Figure 4:
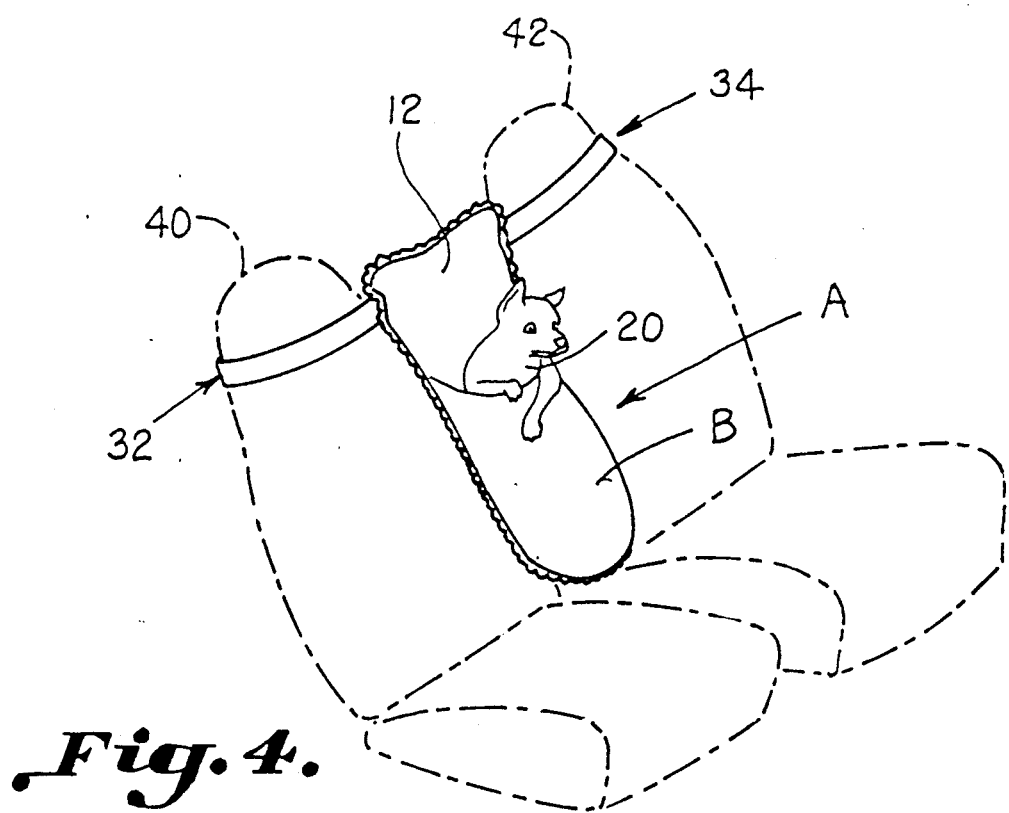
FIG. 4 is a perspective view illustrating a protective pet carrier attached to an automobile seat in accordance with the invention.
Figure 6:
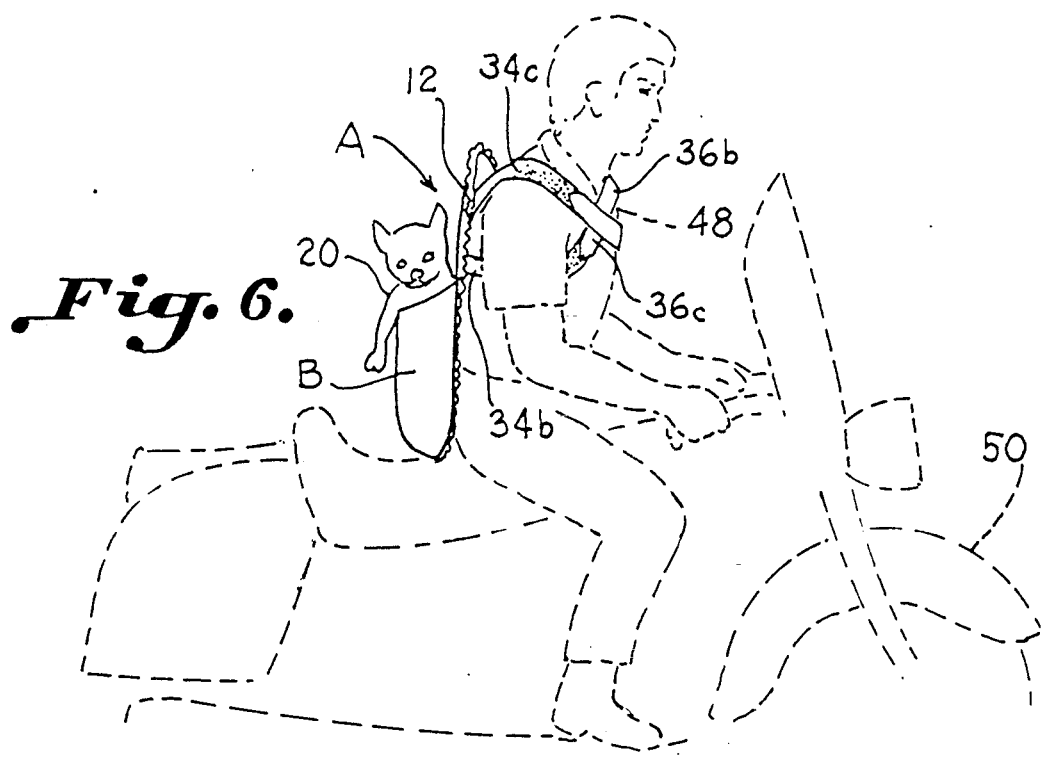
FIG. 6 is a perspective view illustrating a pet transported by a protective pet carrier attached to a person's body for vehicular transportation in accordance with the invention.

Attachment to web 12 and restraining pouch B to an associated structure may include various forms. In one embodiment, there is a hood means C which includes a suitable piece of fabric secured to an upper portion 12a of web 12 by any suitable means, such as stitching. Restraining pouch B has a pouch opening 22 for receiving pet 20 at a first end of pouch B and a pouch closing 24 at a second end of pouch B which may be formed by stitching. The entire restraining pouch B may be stitched to web 12 around its periphery to form the pouch. As can best be seen in FIG. 5, restraining pouch B has a height of such that it effectively captivates and renders pet 20 immobile. For this purpose, pouch B extends from closure 24 to opening 22 so that an outer edge 26 of pouch B terminates near the forward arm and shoulder 28 of pet 20. Hood means C has a hood opening 30 which is generally horizontal and disposed in an opposite direction from pouch opening 22. Hood means C is carried on a reverse side of web 12 than that of restraining pouch B. All of which can best be seen in FIG. 5. Attachment means additionally may include plural straps in the form of first strap means 32 carried on a first side 32a of web 12 and second strap means 34 carried on a second side 34a of web 12. Strap means 32 includes a strap 32b, 32c and second strap means 34 includes a strap 34b, 34c. Hock and loop Velcro material 36a, 36b may be used to connect the straps. As can best be seen in FIG. 4, first strap means 32 attaches web 12 to a first seat 40 while second strap means 34 fastens web 12 to a second seat 42 leaving restraining pouch B disposed between the backs of seats 40, 42. This may be advantageous so that the pet is near the occupant of the vehicle for further restraining the pet or merely for convenience of having the pet near the person. As can best be seen in FIG. 3, hood means C is received over a head rest 44 of a seat of a vehicle for attaching web 12 and carrier pouch B. Referring to FIG. 6, it can be seen that web 12 and restraining pouch B are carried on the back of a person 48 which is in transit on a motorcycle vehicle 50. In this case, first strap means 34 and second strap means 36 are criss-crossed and attached by means of Velcro, as can best be seen in FIG. 6.

As can best be seen in FIG. 7, an alternate embodiment of the invention is illustrated wherein the attachment means includes a frame means D having a first frame leg 60 carried on first side 33a of web 12 and a second frame leg 62 carried on second side 34a of web 12. There is a third transverse frame leg 64 carried between frame legs 60 and 62 spacing the same apart. Connection means is provided in the form of a hook shaped frame 64a, 60a which can hook on a person's back or on the back of a seat. A first side sleeve 66 is formed on web 12 in which frame leg 60 is slidably received and a second side sleeve 68 is formed on a second side of web 12 for slidably receiving second frame leg 62. A third sleeve 70 slidably receives leg 64. End caps 72 are provided on the ends of transverse leg 64 so that it may be quickly removed from leg 60, 62 so the entire frame assembly may be knocked down and separated from the web. In this case, web 12 and pouch B may be attached to the seat back once again by hood means C.

Accordingly, it can be seen that an advantageous construction for a pet carrier and restraint device can be had in accordance with the invention so that the pet may be transported by vehicle safely to both the occupant of the vehicle or pedestrian.

While a preferred embodiment of the invention has been described using specific terms, such description is for illustrative purposes only, and it is to be understood that changes and variations may be made without departing from the spirit or scope of the following claims.

What is claimed is:

1. A protective pet animal carrier for use in a vehicle and the like comprising:

a web of flexible material having a first side and a second side;

a front panel of flexible material having a top free edge unattached to said web and having remaining perimeter edges secured to said web so as to form a non-supported pouch continuously closed about said perimeter edges of said front panel;

said pouch having a pouch opening at said top edge of said front panel and said pouch is closed off except for said pouch opening defining a pouch closure having a non-rigid bottom so that said pouch is freely hanging to limit the exit of said animal;

means for attaching said web to an associated structure of said vehicle so that said pouch opening is disposed generally horizontal, and said pet is carried within said pouch in a generally vertical orientation; and said pouch having a height which extends from said pouch closure to said pouch opening which captivates said pet and renders said pet generally immobile during transit in said vehicle.

2. The device of claim 1 wherein said attachment means comprises a hood means carried by a portion of said web extended above said front panel for securing said web on a seat of said vehicle, said web opposite said pouch, said hood having a hood opening which faces in an opposite direction from said pouch opening of said pouch.

3. The device of claim 2 wherein said attachment means further includes plural straps carried by said web for securing said web to said seat of said vehicle.

4. The device of claim 3 wherein said plural straps comprise first strap means for securing said web to a first side of said seat and a second strap means for securing said web to a second side of said seat so that said pet pouch is disposed between said seats.

5. The device of claim 1 wherein said attachment means comprises plural straps for attaching said web to said vehicle.

6. The device of claim 5 wherein said plural straps comprise first strap means for securing said web to a first side of a seat of said vehicle and second strap means for securing an opposite side of said web to said vehicle seats.

7. The device of claim 1 wherein said attachment means comprises a generally rigid frame on which said web is carried, and connection means for connecting said frame to said vehicle.

8. The device of claim 7 wherein said connection means comprises a hook like element carried by said frame generally on opposing sides of said web for connecting said frame and web to said vehicle.

9. The device of claim 7 wherein said frame comprises a first frame leg carried by a first side of said web, a second frame leg carried by a second side of said web, and a transverse frame member extending between said first and second frame legs spacing said frame legs apart, and connection means carried at a first end of said frame leg for connecting said frame to said vehicle.

10. The device of claim 9 wherein said web includes a first side loop which slidably receives said first frame leg, a second side loop for receiving said second frame leg, and a transverse loop which receives said transverse frame member.

11. The device of claim 9 wherein said frame may be taken apart and said web includes a hood on the opposite side of said web than said pouch which may be received over an upper portion of a seat in said vehicle for attaching said web to said seat in lieu of said frame.

12. The device of claim 1 wherein said web includes padding for the protection of said pet.

13. The device of claim 12 wherein said flexible panel includes a padding to further protect said pet from said vehicle.

14. A protective pet animal carrier for use in a vehicle and the like comprising:
- a web of flexible material having a first side and a second side;
- a front panel of flexible material having a top free edge unattached to said web and having remaining perimeter edges secured to said web so as to form a non-supported pouch continuously closed about said perimeter edges of said front panel;
- said pouch having a pouch opening at said top edge of said front panel and said pouch is closed off except for said pouch opening defining a pouch closure having a non-rigid bottom so that said pouch is freely hanging to limit the exit of said animal;
- hood means for attaching said web to an associated structure of said vehicle so that said pouch opening is disposed generally horizontal, and said pet is carried in said pouch in a generally vertical orientation; and said hood means having a hood opening in which an upper portion of a seat of said vehicle is received, said hood opening facing in an opposite direction from said pouch opening; and
- said pouch having a height which extends from said pouch closure to said pouch opening which so that an upper edge of said pouch terminates generally near an upper arm and shoulder of said pet to protectively captivate said pet and render said pet generally immobile in transit on said vehicle.

15. The device of claim 14 wherein said device includes plural straps for fastening said web to said associated structure of said vehicle including a first strap means secured to a first side of said web for attaching said web to said structure and second strap means connected to a second side of said web for attaching said web to said associated structure so that said web and restraining pouch are carried between said strap means.

16. The device of claim 1 including frame means on which said web may be carried, said frame means including connection means for connecting said frame to an associated structure of said vehicle.

17. The device of claim 16 wherein said frame means includes a knock-down assembly which has a first frame leg carried by a first side of said web, a second frame leg carried by a second side of said web, and a transverse leg extending between said first and second legs for spacing the same apart, and connection means for connecting said frame means to said associated structure of said vehicle.

18. The device of claim 15 wherein said web includes padding for protecting said pet.

19. The device of claim 18 wherein said pouch includes a flexible piece of material secured to said web, and padding is carried by said flexible material for protecting said pet.

* * * * *